Patented Jan. 19, 1937

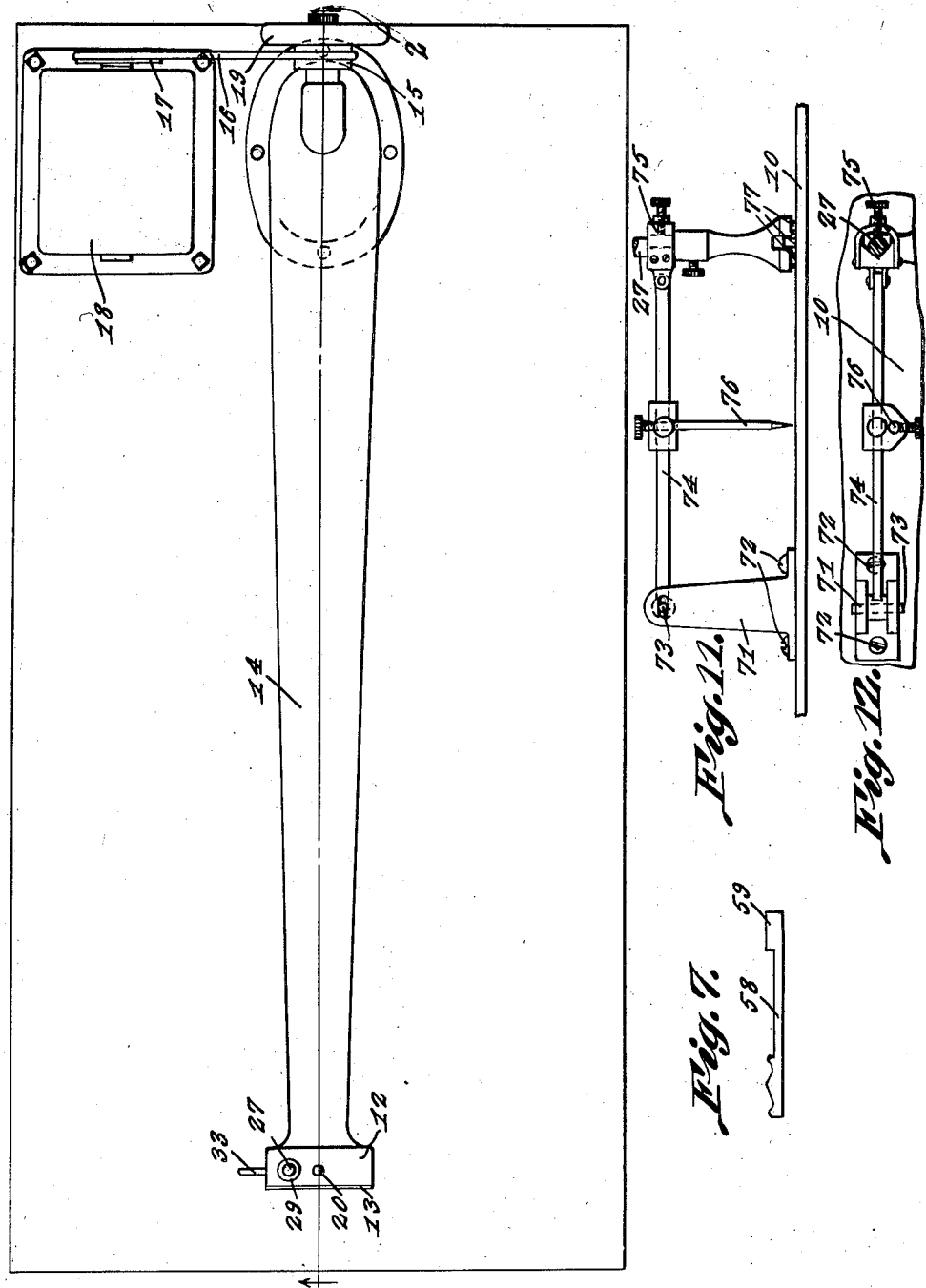

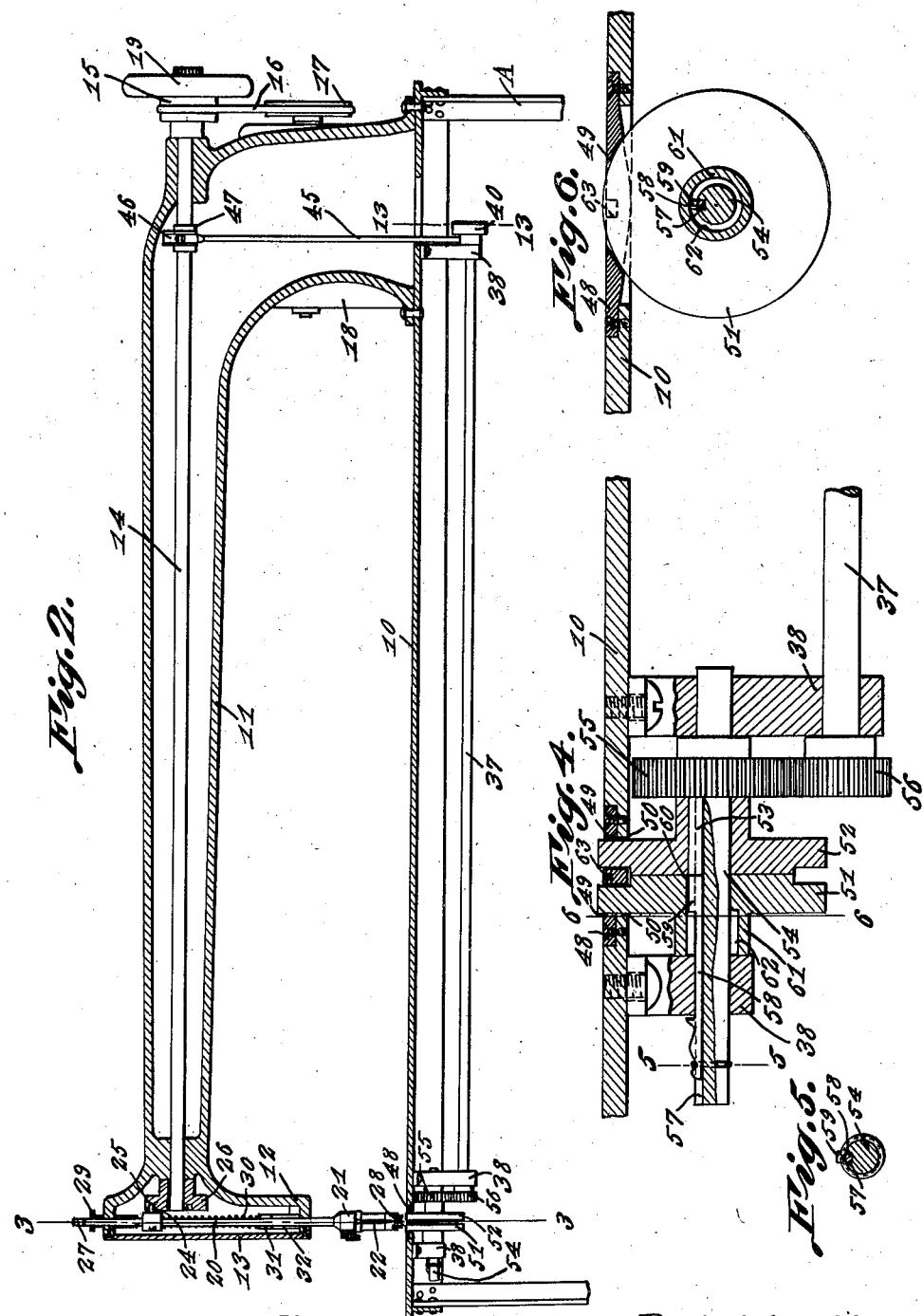

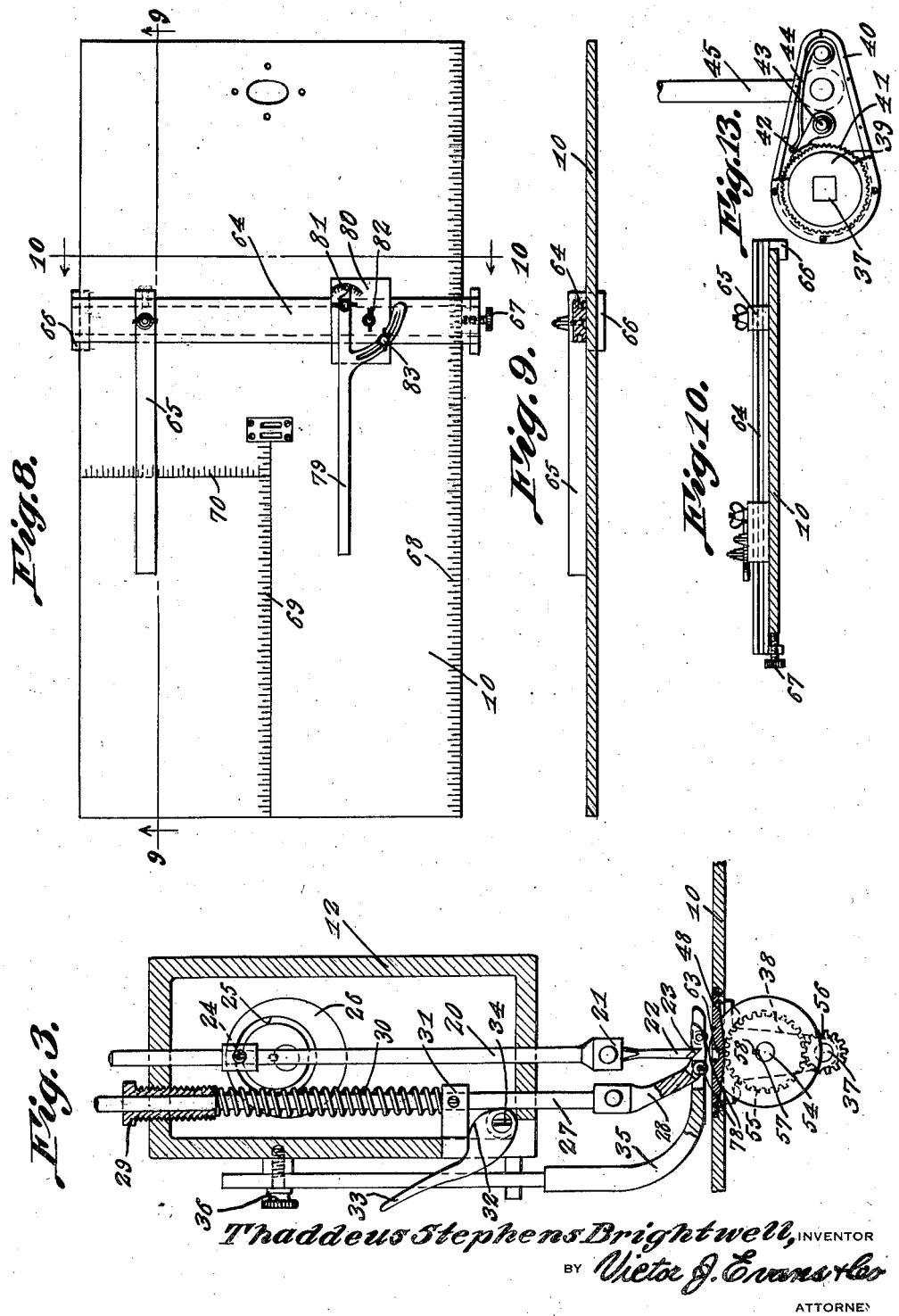

2,068,445

UNITED STATES PATENT OFFICE 2,068,445

CUTTING MACHINE

Thaddeus Stephens Brightwell, Rankin, Pa., assignor of one-fourth to William E. Scholtz, Braddock, Pa.

Refiled for abandoned application Serial No. 736,802, July 24, 1934. This application October 27, 1936, Serial No. 107,890

3 Claims. (Cl. 164—49)

The invention relates to a cutting machine and more especially to a machine for cutting materails into varying designs.

The primary object of the invention is the provision of a machine of this character, wherein the cutting element is in the nature of a bit and is reciprocated for cutting action, so that sheet material can be acted upon for cutting therefrom variable designs and without waste or the presence of sawdust, because the machine in its operation does not have a sawing action, but contrary thereto has a shearing cut upon the material, without loose cuttings being made.

Another object of the invention is the provision of a machine of this character, wherein the construction thereof is novel in form and the cutting action will assure a fine kerf or cut in the material and varying designs to the material can be had with accuracy and through the instrumentality of a cutting bit.

A further object of the invention is the provision of a machine of this character which is simple in construction, thoroughly reliable and effective for its purposes, easy of operation, accurate in performance, strong, durable, positive in operation, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a top plan view of the machine constructed in accordance with the invention.

Figure 2 is a sectional view on the line 2—2 of Figure 1 looking in the direction of the arrows.

Figure 3 is a sectional view on the line 3—3 of Figure 2.

Figure 4 is a fragmentary longitudinal sectional view through the feed mechanism of the machine.

Figure 5 is a sectional view on the line 5—5 of Figure 4.

Figure 6 is a sectional view on the line 6—6 of Figure 4.

Figure 7 is an elevation of the adjustable key for the feed mechanism.

Figure 8 is a plan view of the work table of the machine.

Figure 9 is a sectional view on the line 9—9 of Figure 8.

Figure 10 is a sectional view on the line 10—10 of Figure 8.

Figure 11 is an elevation of a gage to be employed with the machine.

Figure 12 is a top plan view thereof.

Figure 13 is a sectional view on the line 13—13 of Figure 2.

Similar reference characters indicate corresponding parts throughout the several views in the drawings.

Referring to the drawings in detail, the machine embodying the present invention comprises a suitable stand, a portion being designated at A, and includes a work table or bed 10 from which arises the hollow arm frame 11 overhanging the table or bed 10 for the required distance thereof. This frame 11 includes a hollow head 12 having a removable cheek plate 13, while journaled in the arm portion of the frame 11 is a horizontal driving shaft 14, the same being extended exteriorly of the frame at one end, this end being fitted with a pulley 15. Trained about the pulley 15 is an endless belt 16 which is also trained about a pulley 17 upon the power shaft of a motor 18, preferably of the electric type. The pulley 15 has formed therewith a hand wheel 19 for convenience in starting the machine in event that the belt 16 should slip upon the pulleys 15 and 17.

Mounted within the head 12 is a vertically disposed reciprocating bar 20 having at its lower end a chuck 21 for accommodating a separable cutting bit 22 having the beveled diagonally disposed cutting tip 23. Adjustably mounted upon the bar 20 within the head 12 is an eccentric pin 24 engageable in an eccentric groove 25 in the eccentric disk 26 keyed to the shaft 14, so that on rotation of this shaft, reciprocatory movement will be imparted or transferred to the bar 20 for the actuation of the bit 22, as should be obvious.

Arranged within the head 12, rearwardly of the bar 20, is a presser foot post 27 having detachably secured to its lower end the presser foot 28. The post 27 is slidably fitted in an adjusting sleeve 29 threaded for adjustment in the top of the head 12 for varying the tension of a coiled expansion spring 30 surrounding the said post 27 and seated against a lifter arm 31 adjustably secured upon said post. The arm 31 is engaged with the cam portion 32 of a lifter lever 33, it being pivoted at 34, within the head 12 and accessible without the same for manual manipulation to permit raising and lowering of the presser foot 28. This presser foot 28 acts against sheet material placed upon the bed or table 10 to be cut by the bit 22 under reciprocation thereof.

Mounted exteriorly upon the head 12 is an adjustable guide 35 for the work and this guide is adjustably secured to the head 12 by a binding screw 36, the work being passed between the guide 35 and the table or bed 10 of the machine.

Beneath the table or bed 10 and parallel with the shaft 14 is a feed shaft 37 which is journaled in bearings 38 and this shaft carries a ratchet wheel 39, it being secured on 37 and having loosely embracing the same a hollow arm 40, the ratchet wheel being formed with a roughened serrated or toothed periphery 41 for positive engagement therewith of a ratchet pawl 42 pivoted, at 43, within the arm 40 and acted upon by a tensioning spring 44 suitably fitted within said arm. This arm has adjustably connected therewith the throw link 45 having the eccentric strap end 46 embracing the eccentric 47 upon the shaft 14. It should be apparent that by adjustably connecting the link 45 with the arm 40, the throw of the latter can be varied and under the instrumentality of the eccentric 47 the ratchet wheel 39 will be intermittently rotated in one direction for the turning of the feed shaft 37.

Counterseated within the table or bed 10 is a slotted plate 48 preferably of resilient material having the spaced parallel slots 49, these registering with an opening 50 provided in said table or bed 10 and through which operate the feed wheels 51 and 52, respectively, the latter being keyed, at 53, fast to a stud shaft 54 having the gear 55 meshing with the pinion 56 on the feed shaft 37, the stud shaft 54 being journaled in any suitable manner and having the feed wheel 51 loose thereon. This stud shaft 54 is formed with a keyway 57 in which is fitted a slitable key 58 having the locking nib 59 adapted to engage in a notch 60 in the feed wheel 51, the latter having the hub 61 extended laterally therefrom and forming an annular clearance 62 for the nib 59 of the key 58. This key 58 is manually operable to be shifted in the keyway 57, so that the nib 59 can be brought into or away from the notch 60 in the wheel 51 and when engaged therein will lock the said wheel 51 with the stud shaft 54, so that both feed wheels 51 and 52 will turn or operate in unison. When the wheel 51 is free on the stud shaft 54 it allows the work operated upon to be turned arcuately under a positive drive or feed from the wheel 52. When both wheels 51 and 52 are fixed to the shaft 54, the feed of the work will be in a straight path. The plate 48 has between the slots 49 a portion thereof which lies between the wheels 52 and therein is a countersink 63 for the cutting tip 23 of the bit 22 to assure a complete and full penetration of the bit 22 through the piece of work being cut thereby. The bit 22, under reciprocation, severs the work for the cutting of the same into varying designs or configurations and the kerf as made by the bit 22 will be extremely narrow and without resultant cuttings, as for example, sawdust, in the use of a saw blade, there being no waste to the material in the cutting operation of the machine. The stroke of the reciprocating bar 20 is such as not to carry the bit at its cutting edge 23 beneath the plane of the upper face of the table or bed 10, yet a complete penetration of the work by the bit is had, as the feed rollers contact with the work in a plane above the table or bed 10 for a severance of said work by the cutting edge of the bit. The portion of the plate 48 between the rollers or wheels 51 avoids any possibility of the damaging of the cutting edge of the bit by its contact with said plate.

Adapted to be arranged upon the table or bed 10 is a work gage having the arms 64 and 65, respectively, these being adjustably interfitted with each other and arranged at right angles one to the other, the arm 64 of the gage being provided with terminal clamps 66 and a binding screw 67 for adjustable fastening of the gage upon the table or bed 10, as should be obvious from Figures 8, 9 and 10 of the drawings. The bed or table 10, at its top face, has thereon suitable scales 68, 69 and 70, respectively for the laying out of the work to be cut with accuracy, these scales being cooperative with the gage.

In addition to the gage, the table or bed 10 is adapted to have attached thereto a pattern gage or work guide including an upright 71 made fast, at 72, to said table or bed 10 and to which is hinged, at 73, the arm 74, it having pivoted thereto a clamp 75 for embracing the presser foot post 27. Upon the arm 74 is adjustably mounted a pointer 76 which is capable of tracing a pattern or indicating the trueness of a design, particularly configurations necessitating trueness or uniformity in width throughout the configuration as cut from material.

The machine is adapted for cutting sheet material, as for example, wood board, beaver board, pressed wood, ply wood or in fact any fibrous material, and in the cutting there will be made a fine kerf and the latter is so fine that it does not leave any sawdust shavings or otherwise show signs of being cut. The cutting operation can be started at any place throughout the area of the board or material to be cut and such material can be cut into varying designs or configurations at the will of the operator of the machine.

The hand wheel 19 functions as a balance wheel in the operation of the machine.

The presser foot 28 has fitted therewith at its toe portion the pair of rollers 77 and at the heel portion the single roller 78 in order to facilitate the feeding of the work.

The guide 35 is for the purpose of preventing the work from being lifted from the table when the bit 22 is active upon the work in that if only the presser bar 27 and foot 28 were relied upon to hold the work on the table, the spring 30 would not keep the work solid upon the table, so by adding the guide 35 and fastening it solid by means of the set screw 36, the material or work being cut cannot lift from the table.

The purpose of the pointer 76 is to provide an axis around which the material rotates when being fed by the feeding mechanism.

The arm 64 of the work gage, in addition to the arm 65, has slidably fitted therewith the supplemental gage 79, its slide 80 being marked with a scale 81, and the purpose of this supplemental gage is to facilitate the cutting of material at any angle desired, the slide being fitted with a lock nut 82, while the swinging member of said supplemental gage is held fast by a lock nut 83 upon the slide 80 to be maintained at the angular adjustment desired.

This application is a substitute for application Serial No. 736,802, filed July 24, 1934, which application has become abandoned.

What is claimed is:

1. A machine of the kind described comprising superposed rotatable shafts, a work bed between the shafts, a reciprocating bar operated by the uppermost shaft, a bit carried by the bar for the cutting of work upon the bed, feed means for the work upon the bed and operated by the lowermost shaft and working at opposite sides of the path of movement of the bit, means coacting with said shafts to hold the feed means passive on downward movement of said bit and active on the upward movement of the latter, and a plate interfitting with the feed means and carried by the bed and having a portion confronting the bit, the reciprocating bar having a down stroke preventing the bit from passing below the plane of the upper face of the work bed.

2. A machine of the kind described comprising superposed rotatable shafts, a work bed between the shafts, a reciprocating bar operated by the uppermost shaft, a bit carried by the bar for the cutting of work upon the bed, feed means for the work upon the bed and operated by the lowermost shaft and working at opposite sides of the path of movement of the bit, means coacting with said shafts to hold the feed means passive on downward movement of said bit and active on the upward movement of the latter, a plate interfitting with the feed means and carried by the bed and having a portion confronting the bit, the reciprocating bar having a down stroke preventing the bit from passing below the plane of the upper face of the work bed, said second-named means including a reciprocating member, a rocking part pivoted therewith and turning loose on the lowermost shaft and having a spring tensioned pawl, and a wheel fixed to the lowermost shaft and having a roughened periphery engaged by said pawl, the rocking part being a moving support for said tensioned pawl.

3. A machine of the kind described comprising superposed rotatable shafts, a work bed between the shafts, a reciprocating bar operated by the uppermost shaft, a bit carried by the bar for the cutting of work upon the bed, feed means for the work upon the bed and operated by the lowermost shaft and working at opposite sides of the path of movement of the bit, means coacting with said shafts to hold the feed means passive on downward movement of said bit and active on the upward movement of the latter, a plate interfitting with the feed means and carried by the bed and having a portion confronting the bit, the reciprocating bar having a down stroke preventing the bit from passing below the plane of the upper face of the work bed, said second-named means including a reciprocating member, a rocking part pivoted therewith and turning loose on the lowermost shaft and having a spring tensioned pawl, a wheel fixed to the lowermost shaft and having a roughened periphery engaged by said pawl, the rocking part being a moving support for said tensioned pawl, a guide for the work, and a spring pressed presser foot coacting with the guide and having roller contacts with the work.

THADDEUS STEPHENS BRIGHTWELL.